Patented Aug. 15, 1950

2,519,190

UNITED STATES PATENT OFFICE 2,519,190

POLYHALOGENATED POLYCYCLIC HYDROCARBONS AND INSECTICIDES THEREOF

Julius Hyman, Chicago, Ill., assignor to Velsicol Corporation, Chicago, Ill., a corporation of Illinois No Drawing. Application January 26, 1946, Serial No. 643,759

15 Claims. (Cl. 167—30)

This application is a continuation-in-part of my copending application Serial No. 607,078, filed July 25, 1945.

This invention relates to a new class of compositions of matter and to methods of producing them.

The invention relates also to insecticides composed of these new compositions of matter and to insecticidal preparations including the new compositions as active ingredients.

It has been found, as is disclosed in the copending application of Herzfeld, Lidov and Bluestone, Serial No. 639,416, filed January 5, 1946, that hexahalocyclopentadienes, contrary to expectation and the teaching of the prior art, react quite generally with dienophiles to form novel Diels-Alder adducts.

The Diels-Alder Diene Synthesis (or "Diene Synthesis," as the reaction is frequently more simply described), as herein referred to, consists of the 1,4 addition to a conjugated diene of an olefinic double or triple bond. While the reaction is now well established, its announcement is relatively recent. Accordingly, in order to avoid any possible confusion, the following terminology, frequently employed in the literature, will be used when convenient in the specification and claims: (1) The unsaturated compound participating in the reaction with a diene is called a dienophile; (2) the product of the reaction is called an adduct; and (3) the reactants, the diene and the dienophile, are referred to jointly as the generators of the adduct, or simply as generators.

The present invention concerns the halogenated derivatives of the aforementioned hexahalocyclopentadiene Diels-Alder adducts. A specific example of such a halogenated compound is the octachlorodicyclopentadiene dihydride, resulting from the addition of one mol of chlorine to the adduct cyclopentadiene - hexachlorocyclopentadiene.

I have found that the halogenated derivatives of my invention prepared from the Diels-Alder type adducts of Herzfeld, Lidov and Bluestone are, in general, more active as insecticides than are the parent adducts. This unexpected increase in insecticidal potency appears to be independent of whether the halogen reaction product finally obtained is the result of halogen addition to any unsaturated bonds which there may be in the molecule, of halogen substitution for hydrogen, of halogen substitution for halogen, or of some combination thereof. Of course, as might be expected, not all products so obtainable are equally effective as insect toxicants. Furthermore, any halogen appears to possess the property of altering the insecticidal value of the parent adduct although the degree of enhancement obtained varies with the halogen employed.

As might be expected, a variety of halogenation processes may be required to produce the various halogenated derivatives encompassed by my invention. Processes for the preparation of various types of my halogenated derivatives, and specific procedures applicable to the synthesis of a number of examples, are further disclosed herein.

Thus, for the purpose of illustration, but not limitation, I hereinafter describe my invention by reference to the following examples which show specific methods for producing the halogenated products of my invention and the character of the resulting products, together with indications of their uses and advantages.

The various hexahalocyclopentadienes employed in the following examples were prepared by the methods described in the application above noted. For the sake of brevity the hexachlorocyclopentadiene-cyclopentadiene adduct will be hereinafter referred to as H-C-A.

EXAMPLE 1

*Preparation of octachlorodicyclopentadiene-dihydride*

The preparation of this halogenated derivative proceeds smoothly by addition of chlorine to H-C-A to add a molecule of chlorine to the double bond in the five-membered ring.

As a specific example of procedure, one hundred grams of H-C-A are dissolved in 200 ml. of carbon tetrachloride. Chlorine gas is then introduced into the solution, and the chlorine added until the solution registers no further gain in weight. The reaction proceeds at normal room temperature, but I prefer to carry out the reaction at an elevated temperature such as, for example, the reflux temperature of the solution, this temperature being about 75° C. when employing carbon tetrachloride as the solvent. In the alternative other relatively inert solvents, such as heptane, nitrobenzene, or glacial acetic acid, may be employed.

Thereupon the solvent is removed by distillation, and the product distilled under reduced pressure. At about 0.5 to 1.0 mm. mercury pressure the product comes over at about 155–160° C. The distillate is essentially colorless or very pale yellow, is almost odorless, and at room temperature it normally possesses a honey-like consistency. The liquid product prepared by the method just described has a refractive index at 20° C. of 1.575–1.585; it has a specific gravity of about 1.8, and appears to be readily soluble in or miscible with liquid aliphatic and aromatic hydrocarbons, esters, ethers, and ketones. Analysis of the product indicates the empirical formula $C_{10}H_6Cl_8$. I have reason to believe that the structural formula is that shown immediately below. Based on this structure, the compound may be called octachlorodicyclopentadiene-dihydride.

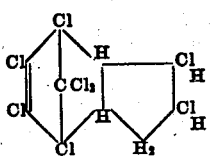

In accordance with accepted nomenclature for compounds having the above represented ring structure, this material may be described as 1,2,4,5,6,7,8,8 - octachloro - 3a,4,7,7a - tetrahydro-4,7-methanoindane. As indicated previously, the foregoing compound is prepared by adding two halogen atoms to the previously described parent compound not containing said additional two halogen atoms. The structure of said parent compound is thus:

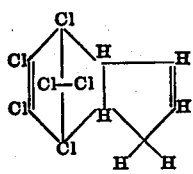

which may in like manner be designated as 4,5,6,7,8,8 - hexachloro - 3a,4,7,7a - tetrahydro-4,7-methanoindene (the hexachlorocyclopentadiene-cyclopentadiene adduct hereinbefore termed H-C-A).

It will be understood that other methods may be employed for chlorinating the adduct, such as pressure chamber technique, the essential requirement being that the starting adduct be subjected to treatment with sufficient chlorine to produce the described product. Thus, I may add chlorine to a solution of the adduct from a convenient source, such as from a pressure cylinder, wherein the gas is conventionally under a pressure of 90-100 pounds per square inch. Gas from the cylinder is intermittently admitted to the reaction vessel until no further appreciable drop in pressure is shown in the reaction vessel, thus indicating completion of the reaction. If desired, due to the exothermic nature of the reaction, cooling may be employed to keep the reaction under control.

This new chlorinated adduct compound has marked insecticidal properties. It is much more potent than the parent adduct H-C-A, as is evidenced by a comparison of the toxicities of the two compounds towards flies, mosquitoes, and many agricultural insect pests. The test procedure employed with the common house fly was the Peet-Grady large group method. Since an essential requirement of the Peet-Grady test is rapid knock-down, commercial hydrocarbon base oil solutions of the two toxicants were made to contain one per cent by volume of an organic thiocyanate knock-down agent. In the concentration used, neither the hydrocarbon base oil nor the knock-down agent had any appreciable effect on the percentage kill.

Under the test conditions just described, 0.1% (by weight) of the parent adduct H-C-A gave a 24-hour kill of 10%; my new octachlorodicyclopentadiene-dihydride gave a 24-hour kill of 54% when used in a concentration of only 0.025%—in other words, with only one-fourth the dosage, the kill was over five times as great.

EXAMPLE 2

Preparation of H-C-A bromides

A di-brominated derivative of the same parent adduct, H-C-A, corresponding to the di-chlorinated derivative of Example 1, may be prepared in somewhat analogous fashion. The reaction does not proceed readily, however, and requires anti-peroxidic reaction conditions and complete absence of light. If to such a reaction mixture is added a little anhydrous aluminum bromide, a vigorous evolution of hydrogen bromide occurs, resulting in the formation of the mono-bromide, instead of di-bromide, of the parent adduct.

A preferred procedure for preparing the mono-bromide is as follows:

A solution of 60 g. of H-C-A in 150 ml. of carbon tetrachloride is swept out with a rapid stream of nitrogen, under a reflux condenser, and to it is added 2 g. of diphenylamine. The system in which the solution is contained is then closed to exclude oxygen.

A solution of 40 g. of bromine in 50 ml. of carbon tetrachloride is dried over phosphorus pentoxide and transferred to a 3-necked flask equipped with a motor stirrer, reflux condenser and gas inlet tube. After starting the stirrer the system is swept out with nitrogen for about 15 minutes and, without discontinuing the nitrogen stream, one gram of diphenylamine is added to the bromine solution, followed by the previously prepared solution of H-C-A and one gram of anhydrous aluminum bromide. The entire reaction system is shielded to protect it from light, and to the end of the condenser is attached a calcium chloride tube. The stirrer is left in operation until the evolution of hydrogen bromide ceases, a period of about 10 hours. The resulting solution is washed successively with water, dilute sodium bisulfite solution, dilute sodium hydroxide solution and water, dried over anhydrous calcium chloride and distilled to remove solvent. The viscous yellow residue is distilled in vacuo. The material distilling at 165–170° C. at 0.8 mm. Hg. is collected. It crystallizes slowly. Three recrystallizations from methanol yield a white crystalline solid melting between 97–104° C.

Analysis: C, 27.7%; H, 1.64%; halogen (as Cl), 58.8%; mol. wt. 439. Calculated for $C_{10}H_5Cl_6Br$: C, 28.7%; H, 1.2%; halogen (as Cl), 59.3%; mol. wt., 418.

This product is believed to have one of the two structural formulas shown below, or it may be a mixture of the two compounds:

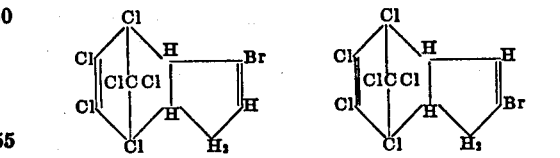

The insecticidal activity of this new compound was compared with that of the parent adduct H-C-A, using the Peet-Grady large group method described in connection with the product obtained in Example 1. A 0.1% solution of H-C-A in a commercial hydrocarbon base oil, containing 1.0% of an organic thiocyanate as a knock-down agent, gave a 24-hour kill (of flies) of 10%; the same concentration of my new mono-bromo derivative (Example 2) gave a kill of 18%.

EXAMPLE 3

Preparation of H-C-A difluoride

To 72 g. of liquid anhydrous hydrogen fluoride contained in a stainless steel bomb cooled to the temperature of a kerosene-solid carbon dioxide bath is added 79 g. of dry lead dioxide and a solution of 102 g. of H-C-A in 150 ml. of anhydrous chloroform. The bomb is sealed, placed in a shaker and permitted to warm up to room temperature while shaking. After shaking for about one hour at room temperature the temperature is raised to 50–60° C. for a three hour period. After bleeding off excess hydrogen fluoride the contents of the bomb are poured onto cracked ice and the resulting mixture is neutralized with sodium bicarbonate. The chloroform layer and two chloroform extracts are combined, washed and dried. Removal of the chloroform leaves a yellow wax-like solid which is sublimed in vacuo. The sublimate is recrystallized from methanol; this removes unchanged H-C-A leaving the desired difluoro derivative in the mother liquor. The latter is evaporated, leaving the crude difluoride and some unchanged H-C-A. This material is fractionated and the light-yellow viscous liquid boiling between 170–177° C. at one mm. Hg. is collected.

EXAMPLE 4

*Chlorination of the hexabromocyclopentadiene-cyclopentadiene adduct*

Other hexahalocyclopentadiene adducts may be halogenated to produce compounds analogous to the foregoing examples. Thus, the Diels-Alder equimolar adduct of hexabromocyclopentadiene and cyclopentadiene may be chlorinated to produce the chloride of the adduct, using the following procedure:

Chlorine is passed for a ten hour period into a refluxing solution of 18 grams of the hexabromocyclopentadiene-cyclopentadiene adduct in 100 ml. of carbontetrachloride. The reaction solution is then washed successively with a sodium bisulfite solution, with a sodium bicarbonate solution and with water and dried over anhydrous magnesium sulfate. The solvent is removed in vacuo and the semi-solid residue remaining is recrystallized from methanol. A crystalline product decomposing at 79° C. is thus obtained.

Analysis: C, 18.15%; H, 1.06%; halogen (as Cl), 43.66%. Calculated for $C_{10}H_6Br_6Cl_2$: C, 17.75%; H, 0.87%; halogen (as Cl), 41.93%.

The product is thus the expected dichloro addition of the hexabromocyclopentadiene-cyclopentadiene adduct.

In preparing the new compounds of my invention described in the preceding examples, halogenation of the Diels-Alder adducts is effected by the direct addition of the halogen to the double bond in the five-membered ring. I may also accomplish the halogenation, however, by other procedures, such as by halogen substitution for hydrogen, halogen substitution for halogen, halogen substitution followed by addition, or halogen addition followed by substitution. Examples 5 to 11, inclusive, describe the preparation of compounds by such procedures.

EXAMPLE 5

(HALOGEN SUBSTITUTION FOR HYDROGEN)

*Preparation of 1-bromo-H-C-A*

A solution containing 339 g. of H-C-A and 7.5 g. of lauroyl peroxide in 800 ml. of carbon tetrachloride is placed in a 2 liter, 3-necked flask equipped with a motor stirrer, thermometer and reflux condenser. Into a solution of 7.5 g. of lauryl peroxide in about 200 ml. of carbon tetrachloride is weighed 18 g. of bromine. The H-C-A solution is warmed to 40–45° C. and the bromine solution is slowly added at such a rate as to maintain the temperature of the reaction mixture at 40–45° C. The addition requires about an hour. After addition is complete the solution is refluxed for about one-half hour. The solution is then washed with an excess of sodium bisulfite solution (to remove excess bromine), then with water and dried first over $CaCl_2$ and then over anhydrous magnesium sulfate. The solvent is removed in vacuo and the residue is distilled. The material collecting at 130–132° C. at 0.1 mm. is the desired product. It is liquid when collected but may solidify on standing at room temperature.

Analysis: C, 27.65%; H, 1.36%; halogen (as Cl), 59.75%; mol. wt., 426. Calculated for $C_{10}H_5Cl_6Br$: C, 28.7%; H, 1.2%; halogen (as Cl), 59.3%; mol. wt., 418.

The compound is thus the desired 1-bromo-H-C-A. It has powerful insecticidal properties. When tested against houseflies by the Peet-Grady large group method described in Example 1, 0.025 per cent by weight of the new compound gave a 24-hour kill of 53%, against a 24-hour kill of 10% for a 0.1 per cent concentration of the parent adduct H-C-A. As before, both toxicants were used in solutions of commercial hydrocarbon base oil containing 1.0 per cent (by volume) of an organic thiocyanate as a knock-down agent.

EXAMPLE 6

(HALOGEN SUBSTITUTION FOR HYDROGEN)

*Preparation of monochloro H-C-A*

A solution containing 34 g. of H-C-A, 0.24 g. of benzoyl peroxide and 54 g. of sulfuryl chloride in 75 ml. of carbon tetrachloride is refluxed for 25 hours. Following this, the solvent is removed in vacuo and the product distilled. The material boiling at 141–142° C. at 0.2 mm. is collected; it is a viscous liquid.

Analysis: C, 32.17%; H, 1.83%; Cl, 65.71%; mol. wt., 359. Calculated for $C_{10}H_5Cl_7$: C, 32.17%; H, 1.35%; Cl, 66.50%; mol. wt., 373.

The product is thus a monochloro substitution derivative of H-C-A.

EXAMPLE 7

(HALOGEN SUBSTITUTION FOR HALOGEN)

*Preparation of 1-iodo-H-C-A*

To a solution of 8.4 g. of sodium iodide in 48 g. of acetone is added 15.7 g. of 1-bromo-H-C-A of Example 5 contained in 30 ml. of acetone. Precipitation of sodium bromide begins almost at once. The mixture, stirred occasionally, is kept in the dark for 24 hours, and then brought onto a filter. The recovery of sodium bromide is almost equal to that predicted by theory. Most of the acetone is removed from the filtrate in vacuo and to the residue sufficient hexane is added to bring all of the material into solution. The hexane solution is washed with dilute sodium bisulfite solution and then dried over anhydrous magnesium sulfate. The hexane is then removed in vacuo and the brown resinous product remaining is crystallized from 95% ethanol by causing it to dissolve at room temperature and then cooling the solution to −5° C. The yellow crystalline product thus obtained melts at 75° C. A second crop is obtained by concentrating the mother liquor in vacuo at a temperature below 30° C.

Analysis: C, 26.3%; H, 1.18%; halogen (as Cl), 51.15%. Calculated for $C_{10}H_5Cl_6I$: C, 25.8%; H, 1.08%; halogen (as Cl), 53.3%.

The material is thus a mono iodo H-C-A.

EXAMPLE 8

(Halogen Substitution for Halogen)

*Preparation of 1-chloro-H-C-A*

A solution of 20 g. of 1-bromo-H-C-A of Example 5 in 75 ml. of ethanol is placed in a 500 ml. 2-neck flask equipped with a motor stirrer and a reflux condenser and to it is added 75 g. of a silver chloride gel that has been thoroughly washed with ethanol. The mixture, undergoing agitation, is then gently refluxed for eight to ten hours. It is protected from light, through the course of the reaction, by appropriate shielding. At the end of the indicated reaction period (after standing over night if convenient) the mixture is brought on a filter and the filtrate is again treated with fresh silver chloride. This procedure is repeated until an aliquot of the alcoholic filtrate fails after sodium fusion to give a test for bromine. The major portion of the alcoholic solution is then filtered, the alcohol is distilled off, and the residue is fractionated in vacuo to separate the desired product.

EXAMPLE 9

(Halogen Substitution Followed by Addition)

*Preparation of a mixture of 1-chloro octachlorodicyclopentadiene-dihydride and 1-bromo octachlorodicyclopentadiene-dihydride*

Into a refluxed, mechanically stirred solution of 47.7 g. of 1-bromo-H-C-A in 100 ml. of carbon tetrachloride chlorine gas is passed at such a rate as to cause it to be completely absorbed. The introduction of chlorine is continued for 6 hours during part of which time bromine is evolved. To the warm mixture is then added 200 ml. of carbon tetrachloride and the organic phase is washed successively with dilute sodium bisulfite solution and with water and is then dried over calcium chloride. The resulting solution is concentrated to a volume of about 100 ml. and then cooled to 0° C. This causes precipitation of the desired product. Further concentration of the mother liquor followed by cooling results in the further isolation of crystalline material. Three recrystallizations of the material first obtained gives a small amount of material melting at 195° C.

Analysis: Carbon, 25.32%; hydrogen, 1.1%; halogen (as Cl), 67.73%. Calculated for $C_{10}H_5Cl_9$: C, 27.03%; H, 1.13%; halogen (as Cl), 71.81%. Calculated for $C_{10}H_5Cl_8Br$: C, 24.58%; H, 1.03%; halogen (as Cl), 65.33%.

From these data it may be deduced that the product obtained is a mixture containing approximately 33.5 moles per cent 1-chloro and 66.5 moles per cent 1-bromo octachlorodicyclopentadiene-dihydride.

The product is a very potent insecticide. When tested against houseflies by the Peet-Grady large group method previously described, a concentration of 0.025 per cent of the new product gave a 24-hour kill of 70 per cent, as compared to a 10 per cent kill with a 0.1% concentration of the parent adduct H-C-A.

EXAMPLE 10

(Halogen Substitution Followed by Addition)

*Preparation of 1-bromo-2,3-dichloro-H-C-A*

Into a solution of 21 g. of 1-bromo H-C-A and 30 g. of anhydrous antimony pentachloride in 100 ml. of carbon tetrachloride contained in a 3-necked flask, fitted with a motor stirrer, a reflux condenser and a gas inlet tube, chlorine gas is passed for a seven hour period while maintaining vigorous agitation. The reaction mixture is then poured into an ice-water mixture to remove the antimony pentachloride; the precipitated antimony hydroxide is brought into solution with concentrated hydrochloric acid and the organic phase is separated, washed successively with dilute sodium bisulfite solution and water and dried over calcium chloride. The solvent is removed in vacuo, and the residue, after cooling, solidifies. It is recrystallized from methanol solution (and treated with a decolorizing carbon while in solution). The white crystals thus obtained melt between 112–115° C.

Analysis: C, 24.49%; H, 0.99%; halogen (as Cl), 65.36%; mol. wt., 467. Calculated for $C_{10}H_5Cl_8Br$: C, 24.58%; H, 1.03%; halogen (as Cl), 65.29%; mol. wt., 488.7.

The compound is thus the expected 1-bromo-2,3-dichloro-H-C-A.

EXAMPLE 11

(Halogen Addition Followed by Substitution)

*Preparation of the chlorinated adduct of hexachlorocyclopentadiene and methylcyclopentadiene*

Into a solution of 17.6 g. of the adduct of hexachlorocyclopentadiene with methylcyclopentadiene in 70 ml. carbon tetrachloride maintained at its reflux temperature a stream of chlorine gas is slowly bubbled until consecutive weighings indicate no further gain in weight. The solution is then washed successively with water, sodium bisulfite and again with water and dried over anhydrous calcium sulfate. The solvent is removed by distillation and the product is then isolated by vacuum distillation at low pressure; the material boiling at 154–159° C. at 1–2.7 mm. Hg. is isolated.

Analysis: C, 29.34%; H, 1.78%; Cl, 69.23%; mol. wt., 413. Calculated for $C_{11}H_8Cl_8$: C, 31.13%; H, 1.89%; Cl, 66.98%. Calculated for $C_{11}H_7Cl_9$: C, 28.79%; H, 1.53%; Cl, 69.68%.

From these data it can be calculated that the product obtained is a mixture containing approximately 80 mole per cent of chloromethyl and 20 mole per cent of methyl-octachlorodicyclopentadiene-dihydride.

The product has marked insecticidal properties. When tested against houseflies by the Peet-Grady large group method previously described, it gave a 24-hour kill of 99 per cent when used in a concentration of 0.5 per cent, whereas a kill of only 36 per cent was obtained with a 1.0 per cent concentration of the parent adduct used in the preparation.

EXAMPLE 12

*Preparation of the dichloride of the adduct of hexachlorocyclopentadiene and isoprene*

Another interesting halogenated derivative of a Diels-Alder adduct of a hexahalocyclopentadiene is the dichloride of the adduct of hexachlorocyclopentadiene and isoprene.

A solution of 4.5 g. of (1,4,5,6,7,7-hexachloro-3-isopropenyl-$\Delta^5$-bicycloheptene (1,2,2)) the hexachlorocyclopentadiene-isoprene adduct in 18 ml. of carbon tetrachloride is placed in a 3-necked flask fitted with a gas inlet tube, a motor stirrer and a condenser. Chlorine is passed into the well-stirred and refluxing solution for a 5-hour period. At the end of this time the solvent is removed and the product is distilled in vacuo;

the material boiling from 150–160° C. at 1.4 mm. Hg. is collected.

Analysis: Cl, 68.68%. Calculated for $C_{10}H_8Cl_8$: Cl, 68.88%.

The material is thus the expected dichloro-addition product of the original adduct. The product is a more potent insecticide than the starting adduct. When tested against houseflies by the Peet-Grady large group method previously described, the original adduct required a concentration of 1.0 per cent to give a 24-hour kill of 20 per cent, whereas the chlorinated product gave a kill of 10 per cent with a concentration of only one-twentieth of the above, or 0.05 per cent. It is to be noted that the processes described in the above examples are conducted in the liquid phase.

It will be obvious to those skilled in the art that my invention may be utilized to prepare many other halogenated Diels-Alder adducts of hexahalocyclopentadienes and dienophiles other than those specifically described above. The wide variety of examples given, however, demonstrate the broad applicability and versatility of the basic principles of my invention.

The many new compounds which may now be prepared as a result of my invention are so varied in nature as to have many applications in industry, agriculture, and the arts. As has already been indicated many of them have utility as insecticidally active agents possessing the advantages of high toxicity and relatively low production costs in addition to other properties which make them particularly valuable in that field. They may be utilized in all the typical ways that other insecticides are used, such as, for example, in dusts, oil sprays, aerosols, water emulsions, etc., and may be applied by any means calculated to utilize their insecticidal properties.

Others of these products of my invention have usefulness as plasticizers in lacquer, varnish, plastic and similar formulations. In such applications the fire resisting properties of these compounds are of great advantage as is also their lower production cost. The high degree of solubility in a variety of organic liquids, which many of them possess, insures compatibility in many types of compositions.

Some of these products may also be expected to find usefulness in compositions requiring the use of tackifiers. The advantages which compounds of these types have as plasticizers will also extend to the field of tackifiers.

The examples of the compounds of my invention and the processes of preparing and utilizing them, which have been described in the foregoing specification have been given for purposes of illustration, not limitation. Many other modifications and ramifications will naturally suggest themselves to those skilled in the art, based on the broad disclosure of my basic discovery; these are intended to be comprehended within the scope of my invention, as defined in the claims.

I claim as my invention:

1. A halogenated hydrocarbon being a derivative of 4,5,6,7,8,8-hexahalo-3a,4,7,7a-tetrahydro-4,7-methanoindene containing from one to three more halogen atoms attached to carbon atoms in positions 1 to 3 of said derivative, no one carbon atom in positions one to three having more than one halogen atom.

2. A halogenated hydrocarbon being a derivative of 4,5,6,7,8,8-hexachloro-3a,4,7,7a-tetrahydro-4,7-methanoindene containing from one to three more halogen atoms attached to carbon atoms in positions 1 to 3 of said derivative, no one carbon atom in positions 1 to 3 having more than one halogen atom.

3. 1,2,4,5,6,7,8,8 - octachloro - 3a,4,7,7a - tetrahydro-4,7-methanoindane.

4. 1,4,5,6,7,8,8 - heptachloro - 3a,4,7,7a - tetrahydro-4,7-methanoindene.

5. 1 - iodo - 4,5,6,7,8,8 - hexachloro - 3a,4,7,7a-tetrahydro-4,7-methanoindene.

6. 1 - bromo - 4,5,6,7,8,8 - hexachloro - 3a,4,7,7a-tetrahydro-4,7-methanoindene.

7. 1,2,3,4,5,6,7,8,8 - nonachloro - 3a,4,7,7a - tetrahydro-4,7-methanoindane.

8. The method of forming a new composition of matter which comprises chlorinating 4,5,6,7,8,8-hexachloro - 3a,4,7,7a - tetrahydro - 4,7-methanoindene in a solvent with chlorine at a temperature below about 200° C. until a substantially equimolar amount of chlorine has reacted with said indene compound.

9. The method of forming a new composition of matter which comprises chlorinating 4,5,6,7,8,8-hexachloro - 3a,4,7,7a - tetrahydro - 4,7 - methanoindene in the liquid phase with chlorine at a temperature below about 200° C. until a substantially equimolar amount of chlorine has reacted with said indene compound.

10. The method of forming a new composition of matter which comprises reacting hexachlorocyclopentadiene with cyclopentadiene at a temperature below 200° C. and chlorinating the resulting reaction product in a solvent with chlorine at a temperature below 200° C. until a substantially equimolar quantity of chlorine has reacted therewith.

11. The method of forming a new composition of matter which comprises reacting 4,5,6,7,8,8-hexachloro - 3a,4,7,7a - tetrahydro - 4,7 - methanoindene in a solvent with chlorine at a temperature from about normal room temperature to about 75° C. until a substantially equimolar quantity of chlorine has reacted with said indene compound.

12. An insecticidal composition of matter comprising 1,2,4,5,6,7,8,8-octachloro-3a,4,7,7a-tetrahydro-4,7-methanoindane and a carrier.

13. An insecticidal composition of matter comprising 1,4,5,6,7,8,8-heptachloro-3a,4,7,7a-tetrahydro-4,7-methanoindene and a carrier.

14. An insecticidal composition of matter comprising 1,2,4,5,6,7,8,8-octachloro-3a,4,7,7a-tetrahydro-4,7-methanoindane in a non-aqueous solvent.

15. An insecticidal composition of matter comprising 1,2,4,5,6,7,8,8-octachloro-3a,4,7,7a-tetrahydro-4,7-methanoindane in association with another insecticidal material having a relatively high knockdown character.

JULIUS HYMAN.

REFERENCES CITED

The following references are of record in the file of this patent:

UNITED STATES PATENTS

| Number | Name | Date |
| --- | --- | --- |
| 2,336,208 | Alder et al. | Dec. 7, 1943 |
| 2,337,043 | Hasselstrom et al. | Dec. 21, 1943 |
| 2,352,606 | Alder et al. | July 4, 1944 |
| 2,382,038 | Bruson | Aug. 14, 1945 |